US012764784B2

(12) United States Patent
Elsherif et al.

(10) Patent No.: US 12,764,784 B2
(45) Date of Patent: Oct. 13, 2026

(54) CHANNEL SWITCHING TO A CHANNEL ASSOCIATED WITH A CHANNEL AVAILABILITY CHECK

(71) Applicant: QUALCOMM Incorporated, San Diego, CA (US)

(72) Inventors: Ahmed Ragab Elsherif, San Jose, CA (US); Vincent Knowles Jones, Redwood City, CA (US); Derrick Chu Lin, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 18/300,906

(22) Filed: Apr. 14, 2023

(65) Prior Publication Data

US 2024/0114549 A1 Apr. 4, 2024

Related U.S. Application Data

(60) Provisional application No. 63/378,343, filed on Oct. 4, 2022.

(51) Int. Cl.

| | |
|---|---|
| ***H04W 74/0808*** | (2024.01) |
| ***H04W 36/06*** | (2009.01) |
| ***H04W 36/22*** | (2009.01) |
| ***H04W 72/0453*** | (2023.01) |

(52) U.S. Cl.

CPC ....... *H04W 74/0808* (2013.01); *H04W 36/06* (2013.01); *H04W 36/22* (2013.01); *H04W 72/0453* (2013.01)

(58) Field of Classification Search

CPC . H04W 72/0453; H04W 16/14; H04W 24/08; H04W 76/15; H04W 88/04; H04W 88/08

See application file for complete search history.

(56) References Cited

U.S. PATENT DOCUMENTS 10,979,885 B1 4/2021 Shukla et al.
11,606,791 B1 * 3/2023 Tsai .................. H04W 72/0453

(Continued)

FOREIGN PATENT DOCUMENTS

EP 3288292 A1 2/2018

OTHER PUBLICATIONS

Scheduling in Dynamic Spectrum Access Networks: Throughput and Fairness Tradeoffs—2016 (Year: 2016).*

(Continued)

*Primary Examiner* — Nizar N Sivji
(74) *Attorney, Agent, or Firm* — Harrity & Harrity, LLP

(57) ABSTRACT

Various aspects of the present disclosure generally relate to wireless communication. In some aspects, a wireless communication device (WCD) may communicate, during a time period, with a peripheral device via a wireless connection, the wireless connection using a first channel for communication. The WCD may monitor a second channel during a concurrency time of the wireless connection, the second channel using a channel availability check (CAC) to obtain resources for communicating, and transmitting an indication to switch to the second channel for communication. In some aspects, the WCD may communicate with low-latency requirements. Numerous other aspects are described.

30 Claims, 10 Drawing Sheets

(56) References Cited

U.S. PATENT DOCUMENTS

| | | | | |
|---|---|---|---|---|
| 2010/0303024 | A1* | 12/2010 | Gossain | H04W 72/04 370/329 |
| 2014/0378179 | A1* | 12/2014 | Nagai | H04W 4/48 455/509 |
| 2015/0271829 | A1* | 9/2015 | Amini | H04W 24/02 370/329 |
| 2016/0249357 | A1* | 8/2016 | Green | H04W 72/0453 |
| 2016/0285611 | A1* | 9/2016 | Fischer | H01Q 21/29 |
| 2017/0034755 | A1 | 2/2017 | Casebolt et al. | |
| 2017/0094651 | A1* | 3/2017 | Green | H04W 16/14 |
| 2018/0014205 | A1 | 1/2018 | Tsai et al. | |
| 2018/0054739 | A1* | 2/2018 | Dutta | H04W 74/0808 |
| 2018/0199342 | A1* | 7/2018 | Rai | H04K 3/226 |
| 2019/0223056 | A1* | 7/2019 | Bajko | H04W 36/06 |
| 2019/0223213 | A1* | 7/2019 | Chee | H04B 1/525 |
| 2019/0342795 | A1 | 11/2019 | McFarland et al. | |
| 2020/0260464 | A1* | 8/2020 | Zhu | H04W 16/10 |
| 2021/0409961 | A1 | 12/2021 | Changlani et al. | |
| 2022/0225108 | A1* | 7/2022 | Ma | H04W 48/16 |

OTHER PUBLICATIONS

Eryigit S., et al., "Cloud-assisted Channel Selection for Wireless Mesh Networks", IEEE International Black Sea Conference on Communications and Networking (BlackSeaCom), 2017, pp. 1-5.

International Search Report and Written Opinion—PCT/US2023/074040—ISA/EPO—Dec. 1, 2023.

* cited by examiner

100

CHANNEL SWITCHING TO A CHANNEL ASSOCIATED WITH A CHANNEL AVAILABILITY CHECK

CROSS-REFERENCE TO RELATED APPLICATION

This patent application claims priority to U.S. Provisional Patent Application No. 63/378,343, filed on Oct. 4, 2022, entitled "CHANNEL SWITCHING TO A CHANNEL ASSOCIATED WITH A CHANNEL AVAILABILITY CHECK," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for channel switching to a channel associated with a channel availability check.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device (WCD). The method may include communicating, during a time period, with a peripheral device via a wireless connection, the wireless connection using a first channel for communication. The method may include monitoring a second channel during a concurrency time of the wireless connection, the second channel using a channel availability check (CAC) to obtain resources for communicating. The method may include transmitting an indication to switch to the second channel for communication.

Some aspects described herein relate to a method of wireless communication performed by a peripheral device. The method may include communicating, during a time period, with a WCD via a wireless connection, the wireless connection using a first channel for communication. The method may include receiving an indication to switch to a second channel for communication, the second channel using a CAC to obtain resources for communicating.

Some aspects described herein relate to a WCD for wireless communication. The wireless communication device may include a memory and one or more processors coupled to the memory. The one or more processors may be configured to cause the WCD to communicate, during a time period, with a peripheral device via a wireless connection, the wireless connection using a first channel for communication. The one or more processors may be configured to cause the WCD to monitor a second channel during a concurrency time of the wireless connection, the second channel using a CAC to obtain resources for communicating. The one or more processors may be configured to cause the WCD to transmit an indication to switch to the second channel for communication.

Some aspects described herein relate to a peripheral device for wireless communication. The peripheral device may include a memory and one or more processors coupled to the memory. The one or more processors may be configured to cause the peripheral device to communicate, during a time period, with a WCD via a wireless connection, the wireless connection using a first channel for communication. The one or more processors may be configured to cause the peripheral device to receive an indication to switch to a second channel for communication, the second channel using a CAC to obtain resources for communicating.

Some aspects described herein relate to a non-transitory computer-readable medium that stores a set of instructions for wireless communication by a WCD. The set of instructions, when executed by one or more processors of the WCD, may cause the WCD to communicate, during a time period, with a peripheral device via a wireless connection, the wireless connection using a first channel for communication. The set of instructions, when executed by one or more processors of the WCD, may cause the WCD to monitor a second channel during a concurrency time of the wireless connection, the second channel using a CAC to obtain resources for communicating. The set of instructions, when executed by one or more processors of the WCD, may cause the WCD to transmit an indication to switch to the second channel for communication.

Some aspects described herein relate to a non-transitory computer-readable medium that stores a set of instructions for wireless communication by a peripheral device. The set of instructions, when executed by one or more processors of the peripheral device, may cause the peripheral device to communicate, during a time period, with a WCD via a wireless connection, the wireless connection using a first channel for communication. The set of instructions, when executed by one or more processors of the peripheral device, may cause the peripheral device to receive an indication to switch to a second channel for communication, the second channel using a CAC to obtain resources for communicating.

Some aspects described herein relate to an apparatus for wireless communication. The apparatus may include means for communicating, during a time period, with a peripheral device via a wireless connection, the wireless connection using a first channel for communication. The apparatus may include means for monitoring a second channel during a concurrency time of the wireless connection, the second channel using a CAC to obtain resources for communicating. The apparatus may include means for transmitting an indication to switch to the second channel for communication.

Some aspects described herein relate to an apparatus for wireless communication. The apparatus may include means for communicating, during a time period, with a WCD via a wireless connection, the wireless connection using a first channel for communication. The apparatus may include means for receiving an indication to switch to a second channel for communication, the second channel using a CAC to obtain resources for communicating.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
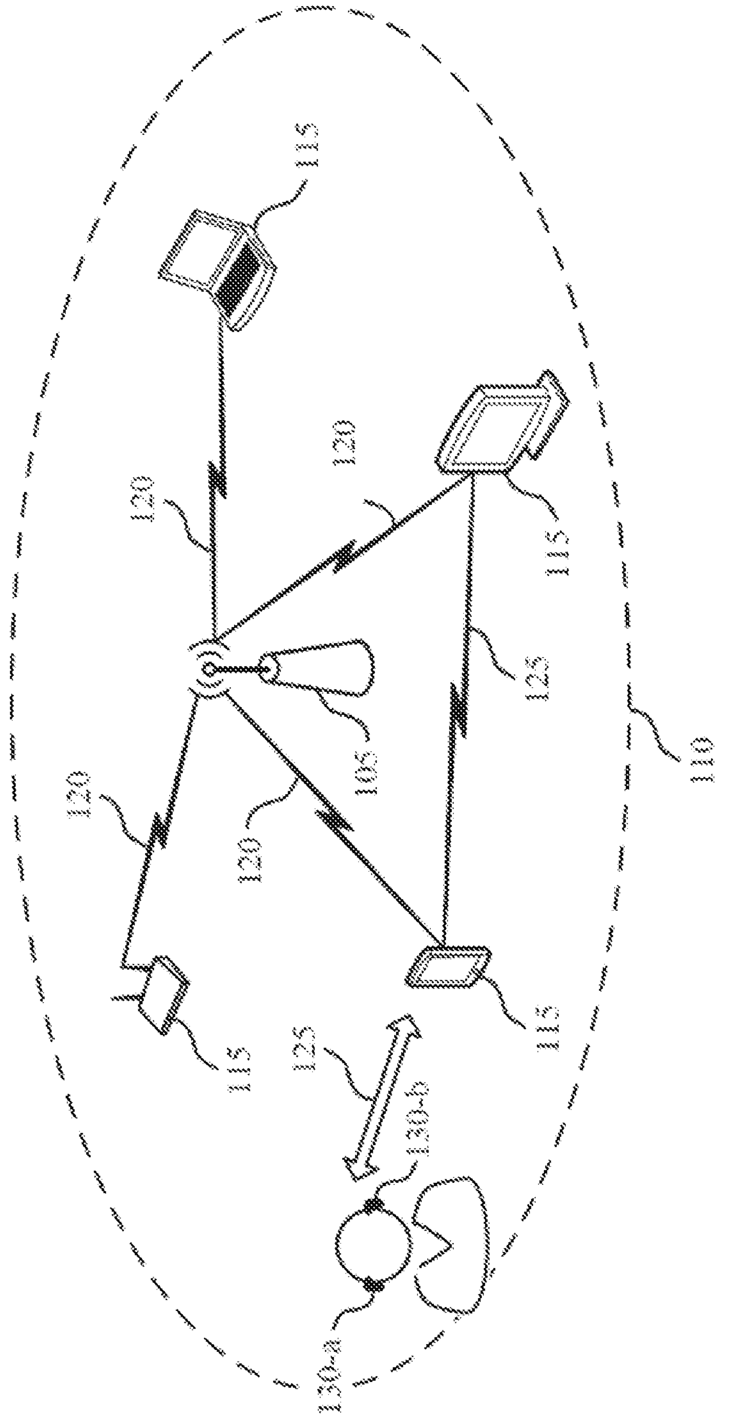
FIG. 1 illustrates a wireless communication system (also known as a wireless local area network (WLAN) or a Wi-Fi network) configured in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a wireless communication device (WCD) may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., peripheral devices) of a user. In scenarios in which a user uses two peripheral devices, the wireless communication device may support an extended personal audio network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a WCD, which may be a handset or an access point (AP) (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). A BSS includes devices that communicate with each other, and an ESS may include multiple BSSs or one or more BSSs and associated wired networks. The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipment (UEs), STAs, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases, the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-*a* and a wireless earbud 130-*b*), the wireless communication device may support an XPAN via which the wireless communication device may communicate with the two peripheral devices.

To meet latency or lossless criteria associated with an application or use case, XPAN devices may employ a TWT technique for communication between the wireless communication device and the peripheral devices. Initial or default TWT parameters may be set under an expectation for ideal (e.g., interference-free or approximately interference-free) conditions and may be updated in response to changing channel conditions or a changing concurrency situation at the wireless communication device. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device, which may be a device 115 (e.g., a handset) or an AP 105, and a set of peripheral devices may use downlink audio data packets to carry updated TWT parameters or any other XPAN-related parameters that the wireless communication device and the peripheral devices may indicate via wireless signaling.

Figure 2:
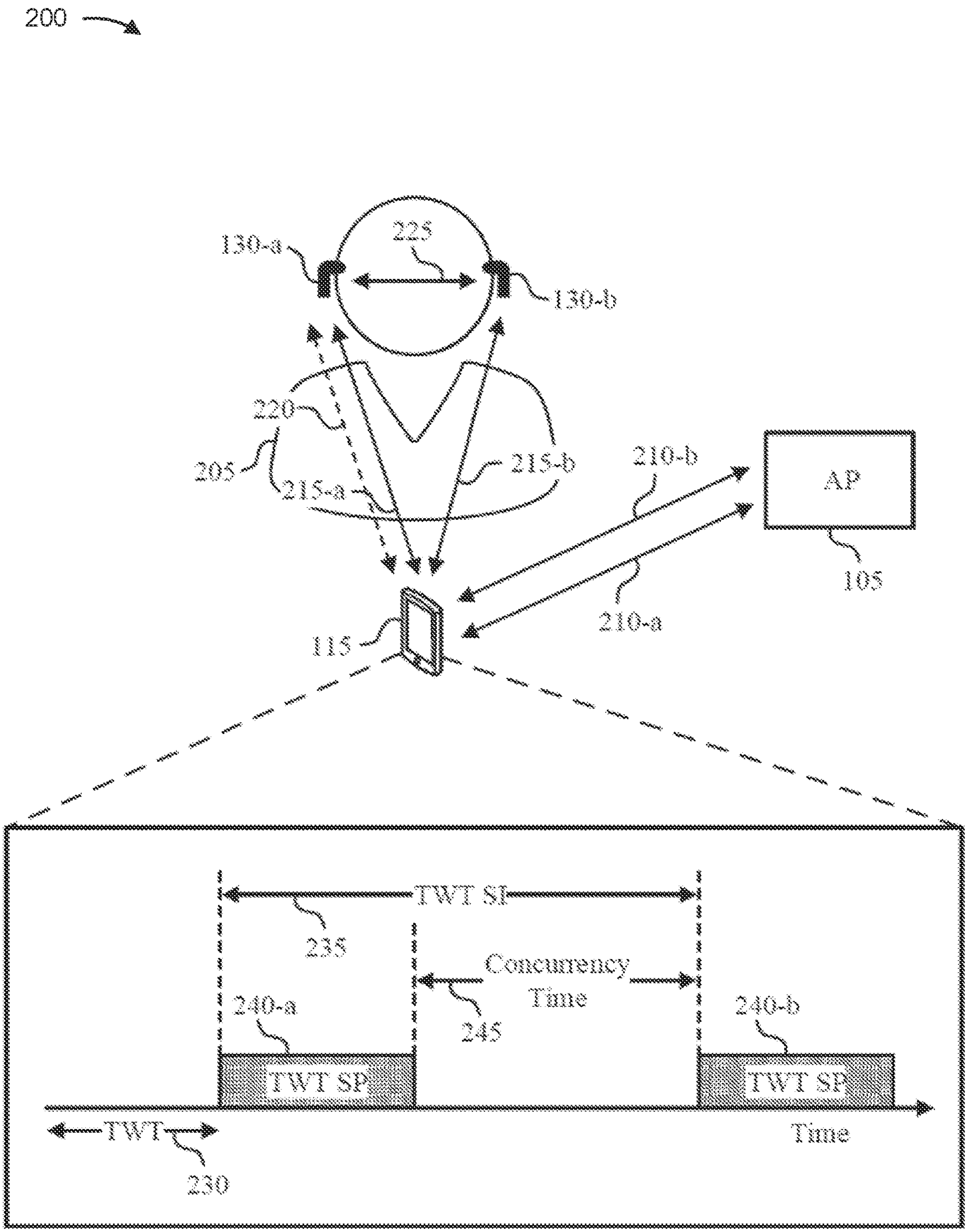
FIG. 2 illustrates an example of a wireless communication system that supports low-latency parameter updates for extended personal audio networks in accordance with the present disclosure.

FIG. 2 illustrates an example of a wireless communication system 200 that supports low-latency parameter updates for extended personal audio networks in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-*a* and a wireless earbud 130-*b* of a user 205 (e.g., examples of audio devices and/or peripheral devices), which may be examples of corresponding devices as illustrated by and described with reference to FIG. 1. In some implementations, the device 115, the wireless earbud 130-*a*, and the wireless earbud 130-*b* may support a signaling-based mechanism according to which the device 115 may transmit an indication of a set of updated parameters to each of the wireless earbud 130-*a* and the wireless earbud 130-*b* via one or audio data packets.

In some deployments, the device 115 may communicate with the AP 105 via one or both of a link 210-*a* and a link 210-*b*, which may be examples of infrastructure links between the AP 105 and the device 115. The link 210-*a* may be an example of a 2.4 GHz link between the AP 105 and the device 115, and the link 210-*b* may be an example of a 5 GHz link or a 6 GHz link between the AP 105 and the device 115. Further, the device 115 may communicate wirelessly with each of the wireless earbud 130-*a* and the wireless earbud 130-*b*, where each of the wireless earbud 130-*a* and the wireless earbud 130-*b* may be associated with an XPAN of the device 115. For example, the device 115 may communicate with the wireless earbud 130-*a* via a link 215-*a* and may communicate with the wireless earbud 130-*b* via a link 215-*b*, where the link 215-*a* and the link 215-*b* may be referred to or understood as XPAN links. The link 215-*a* may be an example of a 5 GHz link or a 6 GHz link and the link 215-*b* may be an example of a 5 GHz link or a 6 GHz link. Additionally, in some examples, the device 115 may communicate with the wireless earbud 130-*a*, which may be an example of a primary earbud, via a communication link 220. The communication link 220 may be an example of a Bluetooth link between the device 115 and the wireless earbud 130-*a*. The wireless earbud 130-*a* and the wireless earbud 130-*b*, which may be an example of a secondary earbud, may communicate with each other via a link 225, which may be an example of a Bluetooth link between the wireless earbud 130-*a* and the wireless earbud 130-*b*.

In some cases, the device 115, the wireless earbud 130-*a*, and the wireless earbud 130-*b* may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-*a* and the wireless earbud 130-*b* (e.g., personal devices of the device 115). For such applications, the device 115 may be expected to keep end-to-end latency below a relatively stringent latency target (e.g., 40 ms for ULL gaming). Further, the device 115 may also be tasked with handling (e.g., gracefully handling) a coexistence of XPAN traffic (e.g., traffic to or from one or both of the wireless earbud 130-*a* and the wireless earbud 130-*b*) with other concurrency scenarios the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-*a* and the wireless earbud 130-*b*, and/or power and concurrency constraints at the device 115, the device 115 may employ a TWT technique for the communication between the device 115 (which may act or function as an SAP) and each of the wireless earbud 130-*a* and wireless earbud 130-*b* (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT session. A TWT SI 235 may indicate a TWT interval, which may refer to a time difference between a start or beginning of two consecutive TWT sessions. A TWT SP 240 may indicate a duration during which one or both of the wireless earbud 130-*a* and the wireless earbud 130-*b* are awake during a TWT SI 235. In some aspects, a TWT SP 240 may be referred to or understood as a TWT session. As illustrated by FIG. 2, the TWT SI 235 may indicate a time difference between a TWT SP 240-*a* and a TWT 240-*b*. A remainder of time within a TWT SI 235 excluding a TWT SP 240 may be referred to or understood as a concurrency time 245 during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless earbud 130-*a* and the wireless earbud 130-*b* (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

In some cases, a default or initial set of TWT parameters for XPAN may be configured or set expecting ideal (e.g., interference-free or approximately interference-free) conditions (e.g., link conditions, channel conditions, or environmental conditions). In some deployments, Wi-Fi channel conditions, a concurrency situation of the device 115, or XPAN constraints may change over time. Such changes may trigger, be associated with, or mandate a TWT parameter update. Further, in applications or use cases associated with low latency (e.g., ULL gaming and streaming lossless audio), the TWT parameter update may be expected to be performed with low latency to continue to meet XPAN constraints without compromising a user experience. As an example, for XPAN gaming use cases, a TWT SP 240 may be approximately 2 ms. A communication overhead of the updated TWT parameters, or other information communicated from the device 115 to the wireless earbud 130-*a* and the wireless earbud 130-*b*, may also be expected to be relatively small.

In some systems, however, a TWT parameter update procedure may be associated with a relatively high latency. Further, because TWT sessions may be initiated by the wireless earbud 130-*a* and the wireless earbud 130-*b* (with default or initial parameters), any update for TWT parameters triggered by a condition change on the device 115 may involve the device 115 transmitting the updated parameters to the wireless earbud 130-*a* and the wireless earbud 130-*b* followed by a TWT parameter change at the wireless earbud 130-*a* and the wireless earbud 130-*b*.

An example TWT parameter update procedure may include a sequence of signaling steps that involve one or more transmissions using a Bluetooth link, which may introduce relatively large delays. For example, a Wi-Fi sub-system (SS) of the device 115 may send, to a Bluetooth host (BT host) of the device 115, a request (e.g., a TWT parameter update request) to update one or more TWT parameters after one or more conditions are detected that trigger one or more TWT parameter changes. The BT host of the device 115 may communicate an updated set of TWT parameters to a BT host of a primary earbud (e.g., the wireless earbud 130-*a*) using a Bluetooth link. Such an updated TWT configuration sent via a Bluetooth link may add approximately 80 ms of delay. The BT host of the primary earbud may signal the new TWT parameters internally to a Wi-Fi SS of the primary earbud, and the BT host of the primary earbud may communicate the new TWT parameters to a BT host of a secondary earbud (e.g., the wireless earbud 130-*b*) using a Bluetooth link. Such an indication of a TWT configuration via a Bluetooth link between the primary earbud and the secondary earbud may add approximately 120 ms of delay. The BT host of the secondary earbud may signal the new TWT parameters internally to a Wi-Fi SS of the secondary earbud.

The Wi-Fi SS of the primary earbud may start a TWT session teardown and parameter update process. The TWT session teardown and parameter update process may involve a transmission, from the Wi-Fi SS of the primary earbud to the Wi-Fi SS of the device 115 via an XPAN Wi-Fi link, of a TWT Teardown message and a TWT Request message that carries the new TWT parameters and a transmission, from the Wi-Fi SS of the device 115 to the Wi-Fi SS of the primary earbud via the XPAN Wi-Fi link, of an acknowledgement (ACK) of the new TWT parameters with a TWT Response message. The Wi-Fi SS of the device 115 may update the BT host of the device 115 that a new TWT session with the primary earbud has been established (e.g., the Wi-Fi SS may indicate a TWT session update to the BT host). Such a TWT session teardown and parameter update process may additionally be performed between the device 115 and the secondary earbud.

In accordance with such a TWT parameter update procedure, the device 115 may incur a relatively large delay between the time that a condition is triggered on the device 115 associated with a TWT parameter update and the time that the updated parameters take effect. For example, some components of the delay may include a delay of approximately 80 ms associated with the updated TWT configuration sent via the Bluetooth link between the device 115 and the primary earbud, a delay of approximately 100 ms associated with a sniff exit delay if the Bluetooth link between the two earbuds is in sniff mode, a delay of approximately 20 ms associated with the updated TWT configuration sent via the Bluetooth link between the two earbuds, and a delay of approximately 5 ms associated with the teardown of the TWT sessions and the re-establishment of new TWT sessions from both earbuds. Accordingly, such a TWT parameter update procedure may be associated with a total end-to-end delay of approximately 205 ms for a one-time TWT parameter update, which may be too much for some applications or use cases (e.g., ULL gaming and streaming lossless audio use cases).

In some implementations, the device 115, the wireless earbud 130-*a*, and the wireless earbud 130-*b* may support a data-packet-generation-based and signaling-based mechanism according to which the device 115 may embed an indication of one or more updated parameters in one or more audio data packets that the device 115 may transmit to the wireless earbud 130-*a* and the wireless earbud 130-*b*. For example, if the device 115 detects a change that triggers a parameter update, or if the device 115 otherwise determines to transmit a set of parameters to the wireless earbud 130-*a* and the wireless earbud 130-*b* with low latency, the device 115 may embed the parameters in one or more downlink audio data packets and may transmit the one or more downlink audio data packets to the wireless earbud 130-*a* and the wireless earbud 130-*b*. In some implementations, the device 115 may transmit an indication of the parameters to the wireless earbud 130-*a* via a first audio data packet transmitted using a first Wi-Fi link (e.g., a first XPAN Wi-Fi link) and may transmit an indication of the parameters to the wireless earbud 130-*b* via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

The device 115 may convey a set of one or more parameters to both of the wireless earbud 130-*a* and the wireless earbud 130-*b* in the course of expected downlink data transmissions or traffic (e.g., without using any additional or dedicated signaling). In accordance with such a lack of additional over-the-air Bluetooth or Wi-Fi signaling between the device 115 and each of the wireless earbud 130-*a* and the wireless earbud 130-*b*, and between the wireless earbud 130-*a* and the wireless earbud 130-*b*, a total end-to-end delay may be one or a relatively small quantity of TWT SIs 235, which may correspond to a delay of approximately 4 or 8 ms for some applications or use cases (e.g., ULL gaming). Such a delay of approximately 4 or 8 ms may represent a significant cut down in end-to-end delay of TWT parameter renegotiation compared to other example parameter update procedures (which may incur delays of approximately 205 ms).

The device 115, the wireless earbud 130-*a*, and the wireless earbud 130-*b* may achieve up to approximately 50× faster response time to any condition change on an XPAN or infrastructure link associated with the device 115. In other words, the described techniques may allow or facilitate an agile XPAN system that can adapt to changing wireless conditions associated with an XPAN or infrastructure link at the device 115. Accordingly, the described techniques may be applicable to any latency-sensitive applications or use cases using TWT as the communication protocol between potentially power-constrained devices or any other use cases that are associated with or expect low-latency XPAN parameter updates from a default or initial set of programmed values.

Further, the described techniques may allow or facilitate an updating of one or more TWT parameters at the same time and may additionally, or alternatively, be used for communicating any other information (XPAN-related or otherwise) between the device 115, the wireless earbud 130-*a*, and the wireless earbud 130-*b* in a fast and efficient way. For examples, the parameters that may be communicated between the device 115 and each of the wireless earbud 130-*a* and the wireless earbud 130-*b* may include a set of one or more TWT parameters, a received signal strength indicator (RSSI) measured at either the device 115 or one or both of the wireless earbud 130-*a* and the wireless earbud 130-*b* that is expected to be communicated to the device 115 or one or both of the wireless earbud 130-*a* and the wireless earbud 130-*b*, a channel switch indication or request, or a bearer switch indication or request. Such one or more TWT parameters may include any one or more of a TWT SI 235, a TWT SP 240, or a TWT start time (e.g., a TWT 230). Further, such a bearer switch indication or request may be a request for a switch from an XPAN bearer to a Bluetooth bearer, or vice versa.

In some networks using XPAN communications, the networks may support ULL gaming with end-to-end latency parameters along with coexistence with concurrency scenarios in which a WCD has wireless links to an audio device and additional devices. To meet the latency requirements for ULL gaming, power requirements of the audio device and power and concurrency requirements on the WCD, a TWT technique may be is used for communication between the WCD (e.g., acting as an SAP) and the audio device (e.g., acting as an STA). The TWT may be a TSF time indicating a start of a first TWT session. An SI indicates the TWT interval (e.g., a time difference between a start of two consecutive TWT sessions). An SP indicates a duration the audio device will be awake during an SI. A concurrency time is a difference between the SP and the SI and is a time remaining for the WCD to support the additional concurrencies (e.g., communications via additional wireless links). The faster gaming traffic is successfully delivered between the WCD and the audio device, the more concurrency time that can be achieved on an infra link of the WCD. For XPAN, each audio device (e.g., a TWT-requesting STA) may initiate a TWT session with the WCD (e.g., a TWT responding STA).

XPAN gaming traffic may be associated with a latency parameter e.g., (<=2 ms) that is to be reliably satisfied. If an XPAN channel becomes congested, other Wi-Fi devices using the same channel may cause increased channel access latency for XPAN traffic due to the channel being busy, increased jitter due to the varying latency, an increased number of retransmissions due to collision, and/or increased interference when the other Wi-Fi devices are beyond a clear channel assessment (CCA) range, among other examples.

If a channel congestion level increases such that the XPAN traffic is unable to fit within an allocated TWT SP (e.g., 2 ms), audio packets may be retransmitted in a subsequent TWT SI and audio packet loss may eventually occur. If the same condition happens in a subsequent TWT SI, the audio packets may exceed a Time To Play (TTP) limit resulting in unacceptable audio gaps. Additionally, traditional channel switching to perform scanning for a new channel may consume an amount of time beyond an allowed XPAN traffic periodicity and/or end-to-end latency.

Figure 3:
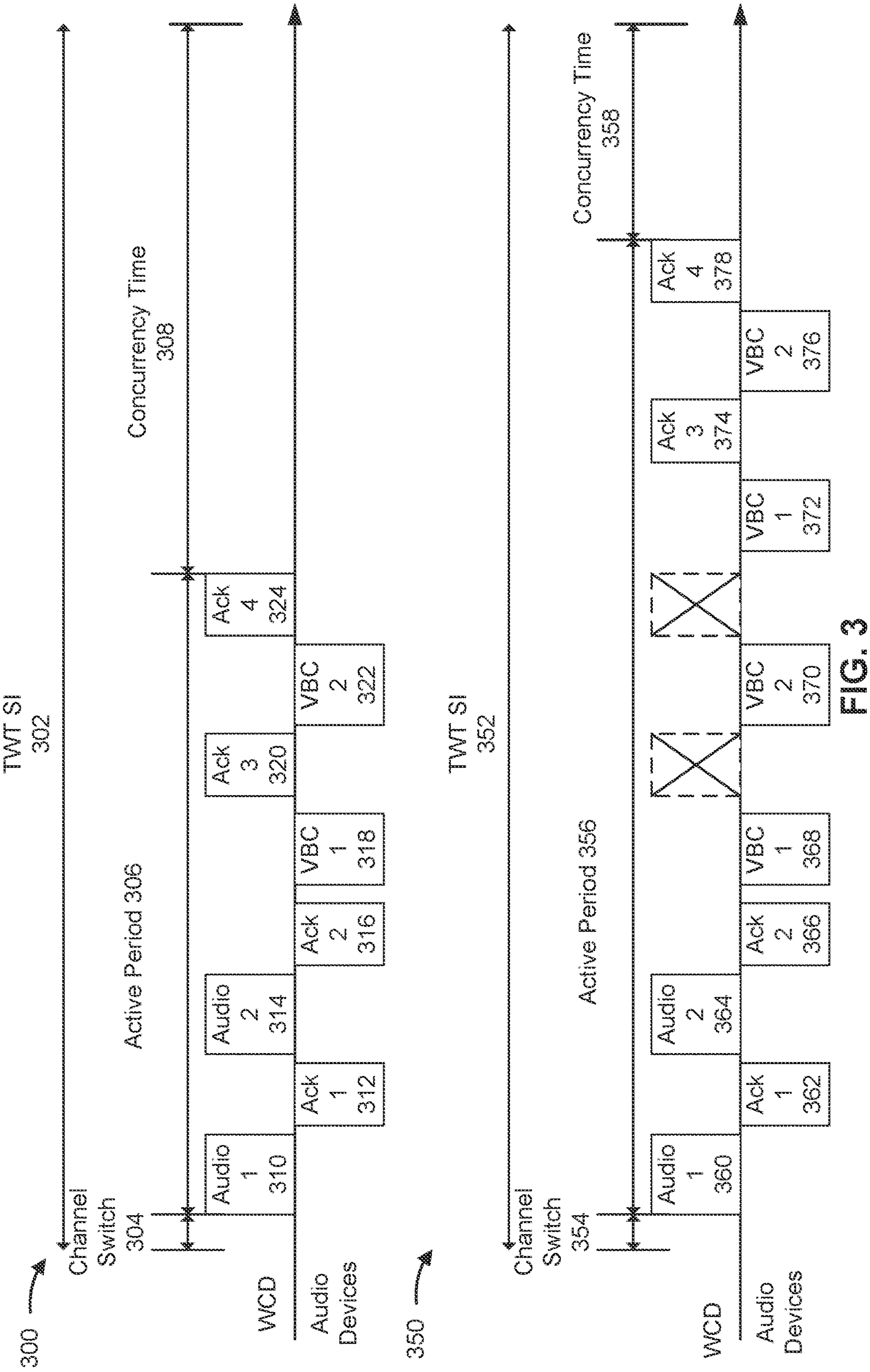
FIG. 3 illustrates examples of target wake time (TWT) packet sequences, in accordance with the present disclosure.

FIG. 3 illustrates examples 300 and 350 of TWT packet sequences, in accordance with the present disclosure. In the context of FIG. 3, a WCD may communicate with one or more audio devices. For example, the WCD may communicate with a first audio device and a second audio device.

As shown in example 300, the WCD may communicate with the one or more audio devices using a TWT technique. The TWT may include a TWT SI 302 associated with a periodicity of TWT communication occasions. The TWT SI 302 may include a channel switch time 304 during which the WCD and/or the one or more audio devices may tune to a channel associated with communicating together. The TWT SI 302 may include an active period 306 during which the WCD and the one or more audio devices exchange communications. After the active period, the TWT SI 302 may include a concurrency time 308 during which the WCD and the audio devices are not schedule communicate with each other via a TWT-based communication.

In the example 300, the WCD may transmit a first audio communication (audio 1) 310 to a first audio device. The first audio device may respond with an acknowledgement (ACK 1) 312 to indicate reception of the first audio communication 310. Similarly, the WCD may transmit a second audio communication 314 (audio 2) to a second audio device. The second audio device may respond with an acknowledgment (ACK 2) 316 to indicate reception of the second audio communication 314.

The first audio device may transmit an uplink communication (VBC 1) 318 to the WCD. The WCD may respond with an acknowledgment (ACK 3) 320 to indicate reception of the uplink communication 318. Similarly, the second audio device may transmit an uplink communication (VBC 2) 322 to the WCD. The WCD may respond with an acknowledgment (ACK 4) 316 to indicate reception of the uplink communication 322.

In the example 350, the one or more audio devices may retransmit one or more communications based at least in part on the WCD failing to respond with an ACK to an uplink communication. In example 350, the TWT may include a TWT SI 352 associated with a periodicity of TWT communication occasions. The TWT SI 352 may include a channel switch time 354 during which the WCD and/or the one or more audio devices may tune to a channel associated with communicating together. The TWT SI 352 may include an active period 356 during which the WCD and the one or more audio devices exchange communications. After the active period, the TWT SI 352 may include a concurrency time 358 during which the WCD and the audio devices are not schedule communicate with each other via a TWT-based communication.

In the example 350, the WCD may transmit a first audio communication (audio 1) 360 to a first audio device. The first audio device may respond with an acknowledgement (ACK 1) 362 to indicate reception of the first audio communication 360. Similarly, the WCD may transmit a second audio communication 364 (audio 2) to a second audio device. The second audio device may respond with an acknowledgment (ACK 2) 366 to indicate reception of the second audio communication 364.

The first audio device may transmit an uplink communication (VBC 1) 368 (audio 1) to the WCD. The first audio device may fail to receive an acknowledgment to indicate reception of the uplink communication 368. Similarly, the second audio device may transmit an uplink communication (VBC 2) 370 to the WCD. The second audio device may fail to receive an acknowledgment to indicate reception of the uplink communication 370.

Based at least in part on failing to receive an ACK from the WCD, the first audio device and the second audio device may retransmit the first uplink communication 368 and the second uplink communication 368 to the WCD. For example, the first audio device may transmit a retransmission of uplink communication (VBC 1) 372 to the WCD. The WCD may respond with an acknowledgment (ACK 3) 374 to indicate reception of the retransmission of uplink communication 372. Similarly, the second audio device may transmit a retransmission of uplink communication (VBC 2) 376 to the WCD. The WCD may respond with an acknowledgment (ACK 3) 378 to indicate reception of the retransmission of the uplink communication 376.

As shown in FIG. 3, a TWT active period may be longer, and a concurrency time may be shorter, when retransmissions occur.

As indicated above, FIG. 3 is provided as an example. Other examples may differ from what is described with regard to FIG. 3.

In some aspects described herein, a WCD may use a Dynamic Frequency Selection (DFS) channel for a wireless link (e.g., using XPAN) with a peripheral device (e.g., an audio device or an extended reality (XR) device). The DFS channel may be associated with a channel availability check to obtain communication resources of the DFS channel (e.g., to determine if the channel is already occupied or not). The DFS channel may be associated with radar-based signaling, military-based communications, or satellite-based communications, which may have higher priority than communications between the WCD and the peripheral device. However, the DFS channel may be unoccupied, during which time the WCD may use the communication resources of the DFS channel. In some aspects, the DFS channel may be associated with a reduced transmission power limit (e.g., to reduce or avoid interference with higher priority communications). In this way, other WCDs and/or peripheral devices may occupy the same communication resources of the DFS at a relatively close distance (e.g., closer than in Bluetooth) without interfering with the communications between the WCD and the peripheral device.

In some aspects, the WCD may satisfy DFS CAC requirements while meeting XPAN latency requirements based at least in part on using a pre-CAC operation for some regulatory domains (e.g., European Telecommunications Standards Institute (ETSI)) or using multiple transmission chains to monitor the DFS channel during communication via a current channel (e.g., an additional DFS channel or a non-DFS channel). The WCD may dynamically switch between DFS channels and/or non-DFS channels when available. In some aspects, a bias toward using DFS channels may be applied when selecting a channel for communication.

In an example using pre-CAC, the WCD may (e.g., at boot time) perform CAC on multiple DFS channels. The WCD may add clean (e.g., unoccupied) DFS channels to an available channel list. When an XPAN session starts, the WCD may perform an initial channel selection to pick a best available DFS channel (e.g., based at least in part on Wi-Fi scan results). The WCD may perform in-service monitoring (ISM) while operating on a DFS channel. If the WCD detects a higher priority communication (e.g., a radar signal) when operating the DFS channel, the WCD may start an XPAN channel move procedure to evacuate the DFS channel to another available DFS channel, if any, or to any other channel (e.g., within a maximum allowed time of 10 s).

In an example using multiple transmission chains to monitor DFS channels, a WCD may begin XPAN on a non-DFS channel. For high band simultaneous (HBS) RDs (e.g., a device with radio filters that support 5 GHz and 6 GHz channels simultaneously), XPAN may begin on 6 GHz to allow DFS scan on the 5 GHz radio. For dual-band simultaneous (DBS) WCDs (e.g., with 2.4 GHz and 5 GHz or 6 GHz) RDs (e.g., without single-band simultaneous (SBS) filters), XPAN may begin on 2 GHz to allow for a DFS scan on the 5 GHz radio. A second SBS radio (e.g., an additional transmission chain) may scan non-overlapping DFS channels for radar and/or available resources. After the CAC duration (e.g., 1 minute-10 minutes (e.g., in weather and/or military channels)), the WCD may move to ISM on DFS channels.

If the initial XPAN non-DFS channel becomes congested, channel switch mechanism can be used to move XPAN to a clean DFS channel (based on Wi-Fi congestion level on the DFS channels).

In some aspects, to have a seamless XPAN channel switching (to or from a DFS channel), XPAN latency may be gradually increased to account for a channel switching time. Once latency is increased, the WCD may transmit a channel switch announcement to the peripheral device (e.g., to inform the peripheral device of an upcoming channel change). The WCD may transmit the channel switch announcement through delivery traffic indication map (DTIM) beacons to the peripheral device or through a vendor specific action frame, among other examples.

Based at least in part on using DFS channels for XPAN wireless links, the WCD may choose a clean channel for XPAN with reduced chances of high interference levels (e.g., based at least in part on DFS channels have lower transmission power regulatory limits and lower associated interference levels). Additionally, or alternatively, the WCD may reduce a need for frequent channel switching, which may avoid disruption to an XPAN quality that may otherwise be caused by increased latency and/or jitter. Further, the WCD may improve XPAN and/or XR reliability for low-latency applications.

Figure 4:
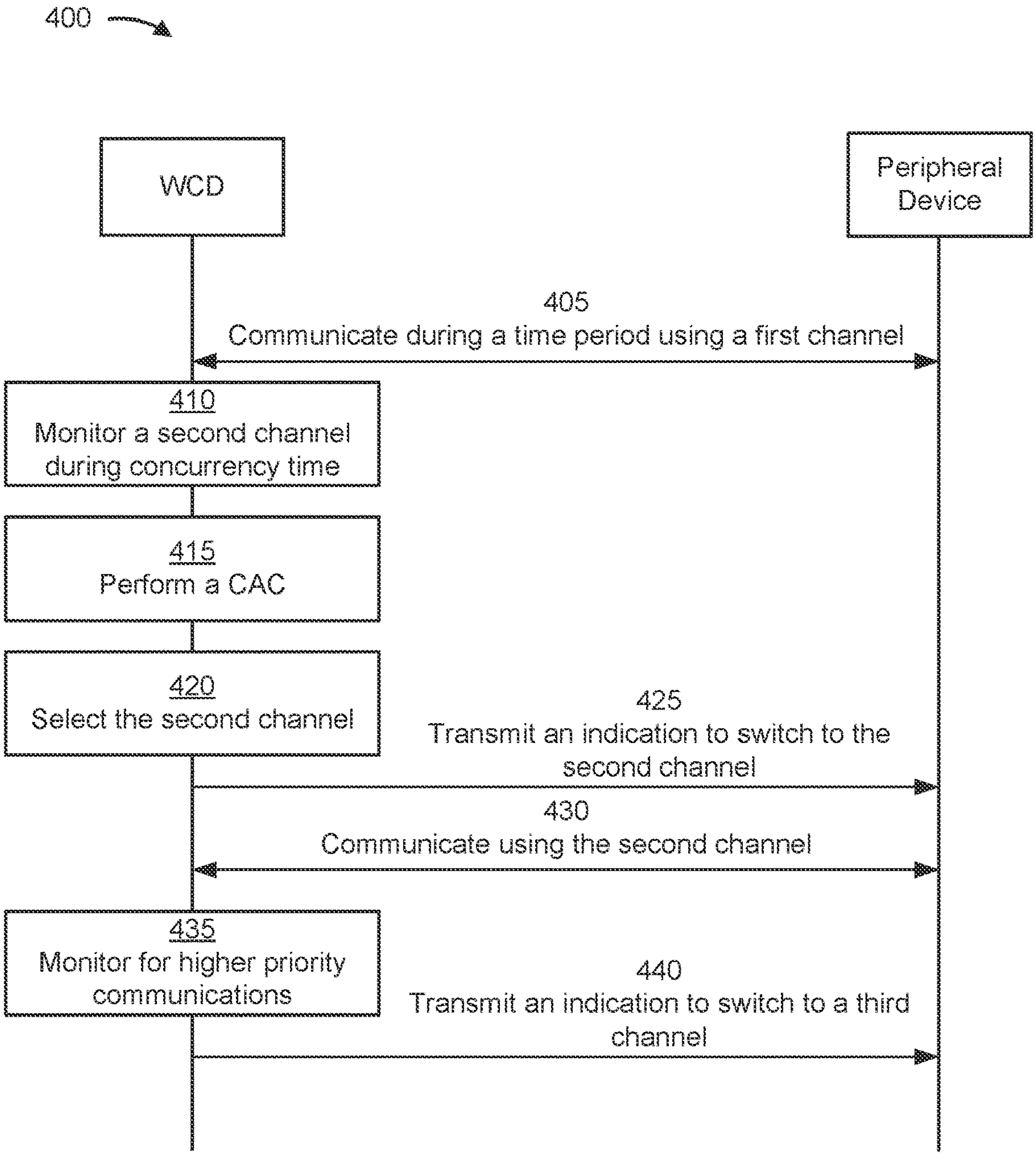
FIG. 4 is a diagram of an example associated with channel switching to a channel associated with a channel availability check, in accordance with the present disclosure.

FIG. 4 is a diagram of an example 400 associated with channel switching to a channel associated with a channel availability check (CAC), in accordance with the present disclosure. As shown in FIG. 4, a WCD (e.g., a STA, a handset, a UE, or host device, among other examples) may communicate with a peripheral device (e.g., an earbud or another audio device, a wireless keyboard or other input device, an extended reality device, and/or a video device, among other examples). In some aspects, the WCD and the peripheral device may have established a wireless connection prior to operations shown in FIG. 4.

As shown by reference number 405, the WCD and the peripheral device may communicate using a first channel during a time period. The WCD and the peripheral device may communicate using a TWT configuration, Bluetooth, or WiFi, among other examples. In some aspects, the first channel uses CAC (e.g., based at least in part on being a DFS channel) or may be a non-CAC channel (e.g., a TWT channel, a Bluetooth channel, or a WiFi channel).

As shown by reference number 410, the WCD may monitor a second channel during concurrency time of communications with the peripheral device using the first channel. In some aspects, the second channel may require a CAC before using the second channel. In some aspects, the second channel may be associated with radar-based signaling, military-based communications, or satellite-based communications, among other examples. In some aspects, the second channel may be associated with a transmission power limit that is less than a transmission power limit associated with the first channel. For example, the transmission power limit may reduce an amount of interference and/or noise over the second channel based at least in part on reducing a coverage of signaling within the second channel. In this way, the second channel may be suitable for communications between the WCD and the peripheral device if the second channel is available (e.g., not in use for higher priority communications).

In some aspects, the WCD may monitor the second channel using a first transmission chain or first radio device that is different from a second transmission chain or second radio device used for communicating using the first channel during the time period. For example, the WCD may tune the second transmission chain and/or second radio device to the first channel and may tune the first transmission chain and/or first radio device to the second channel to check for availability.

As shown by reference number 415, the WCD may perform a CAC to obtain resources for communicating via the second channel. In some aspects, the WCD may identify the second channel as available based at least in part on the CAC. In some aspects, the WCD may monitor the second channel and/or perform the CAC before transmitting an indication to switch to the second channel (e.g., based at least in part on passing the CAC).

As shown by reference number 420, the WCD may select the second channel. In some aspects, the WCD may select the second channel based at least in part on performance of the CAC. In some aspects, the WCD may select the second channel from a set of DFS channel based at least in part on the CAC and/or monitoring for noise on the second channel. In some aspects, the WCD may select the second channel based at least in part on a congestion of the second channel, a bias toward using a channel having a channel type of the second channel (e.g., a bias toward using a channel that uses CAC to obtain resources for communicating).

In some aspects, the WCD may select the second channel and switch to the second channel based at least in part on obtaining resources of the second channel based at least in part on using a CAC and/or congestion or other communication metric of the first channel. For example, the WCD may monitor for the second channel and/or perform the CAC on the second channel based at least in part on congestion of the first channel failing to satisfy a threshold.

As shown by reference number 425, the WCD may transmit, and the peripheral device may receive, an indication to switch to the second channel. In some aspects, the WCD may transmit the indication to switch to the second channel via a channel switch announcement (CSA), or a vendor-specific action frame.

In some aspects, prior to, or along with, transmitting the indication to switch to the second channel, the WCD may provide an indication to increase a latency of communications via the first channel (e.g., communications sent and/or received via the first channel). For example, the WCD may provide the indication to increase the latency of communications to an audio subsystem of the WCD. In this way, communications between the WCD and the peripheral device may not be interrupted during a switch to the second channel.

In some aspects, the WCD may transmit (e.g., within the indication to switch to the second channel) an indication of parameters of the second channel and/or an indication of a time to begin using the second channel.

As shown by reference number 430, the WCD and the peripheral device may communicate using the second channel.

As shown by reference number 435, the WCD may monitor for higher priority communications (e.g., with priority that is higher than that of communications between the WCD and the peripheral device). For example, the WCD may monitor for radar signaling within the second channel. The WCD may be configured to vacate the channel based at least in part on detecting a higher priority communication.

As shown by reference number 440, the WCD may transmit, and the peripheral device may receive, an indication to switch to a third channel. For example, based at least in part on detecting a higher priority communication on the second channel, the WCD may be configured to vacate the second channel. In some aspects, the third channel may request a CAC and/or may be a DFS channel. In some aspects, the third channel may be a non-DFS channel, such as an XPAN channel, a Bluetooth channel, or a Wi-Fi channel.

Based at least in part on using DFS channels for XPAN wireless links, the WCD may choose a clean channel for XPAN with reduced chances of high interference levels (e.g., based at least in part on DFS channels have lower transmission power regulatory limits and lower associated interference levels). Additionally, or alternatively, the WCD may reduce a need for frequent channel switching, which may avoid disruption to an XPAN quality that may otherwise be caused by increased latency and/or jitter. Further, the WCD may improve XPAN and/or XR reliability for low-latency applications.

As indicated above, FIG. 4 is provided as an example. Other examples may differ from what is described with regard to FIG. 4.

Figure 5:
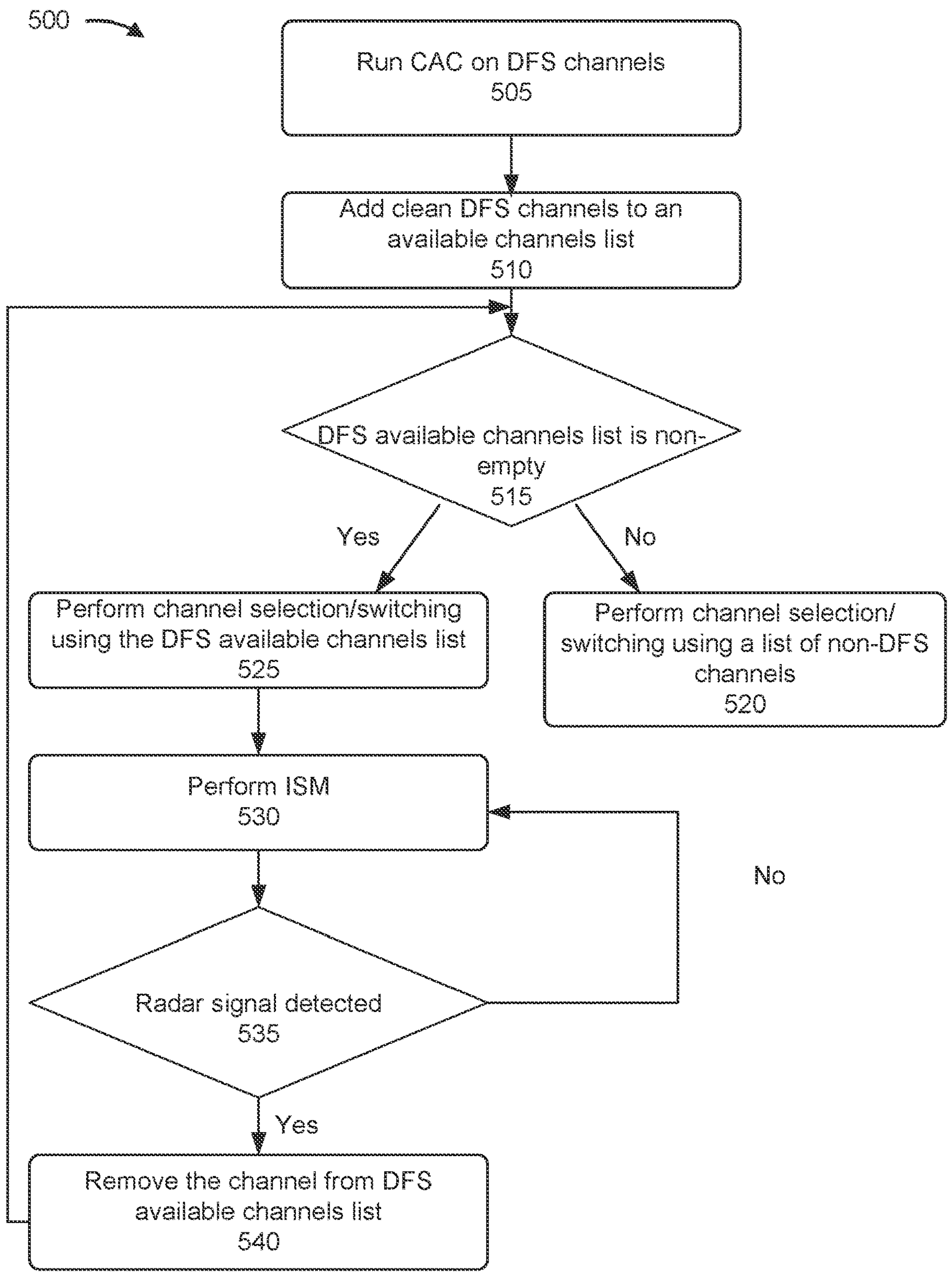
FIG. 5 is a diagram of an example associated with channel switching to a channel associated with a channel availability check, in accordance with the present disclosure.

FIG. 5 is a diagram of an example 500 associated with channel switching to a channel associated with a CAC, in accordance with the present disclosure. In context of FIG. 5, a WCD (e.g., a STA, a handset, a UE, or host device, among other examples) may communicate with a peripheral device (e.g., an earbud or another audio device, a wireless keyboard or other input device, an extended reality device, and/or a video device, among other examples). In some aspects, the WCD and the peripheral device may have established a wireless connection prior to operations shown in FIG. 5.

As shown by reference number 505, the WCD may run CAC on DFS channel. For example, the WCD may perform CAC upon boot up of the WCD or turning on a transmission chain or radio device of the WCD.

In some aspects, the WCD may start on a non-DFS channel. For example, XPAN may start on a non-DFS channel. For WCDs that are capable of simultaneously operating in two high-frequency bands (e.g., two band within the 5 GHz and/or 6 GHz bands) using RF filters (e.g., high band simultaneous (HBS) WCDs) reference designs (RDs) (with single-band simultaneous (SBS) filters), XPAN may start on a 6 GHz channel to allow for a DFS scan on a 5 GHz radio. For dual-band simultaneous (DBS) WCDs (e.g., with 2.4 GHz and 5 GHz or 6 GHz) RDs (without an SBS filters), XPAN may start on 2 GHz to allow for a DFS scan on the 5 GHz radio. In some aspects, a different SBS radio may be used to scan non-overlapping DFS channels for radar.

In some aspects, if an initial XPAN non-DFS channel becomes congested, a channel switch mechanism may be used to move XPAN communications to a clean DFS channel (e.g., based on Wi-Fi congestion level on the DFS channels).

As shown by reference number 510 the WCD may add clean (e.g., unoccupied) DFS channels to an available channels list.

As shown by reference number 515, the WCD may determine if the DFS available channels list is non-empty. For example, the WCD may determine if the DFS available channels list is non-empty upon starting an XPAN session or during an XPAN session (e.g., based at least in part on detecting a trigger to switch from a current channel)

As shown by reference number 520, if the DFS available channels list is not non-empty, the WCD may perform channel selection and/or switching using a list of non-DFS channels.

As shown by reference number 525, the WCD may perform channel selection and/or switching using the DFS available channels list.

As shown by reference number 530, the WCD may perform ISM while operating on a DFS channel. For example, the WCD may monitor for higher priority communications on the DFS channel.

As shown by reference number 535, the WCD may determine if radar signals or other higher priority signals are present on the DFS channel. If not, the WCD may continue monitoring the DFS channel with ISM.

As shown by reference number 540, if the WCD does detect radar signaling on the DFS channel, the WCD may remove the channel from the DFS available channels list.

As indicated above, FIG. 5 is provided as an example. Other examples may differ from what is described with regard to FIG. 5.

Figure 6:
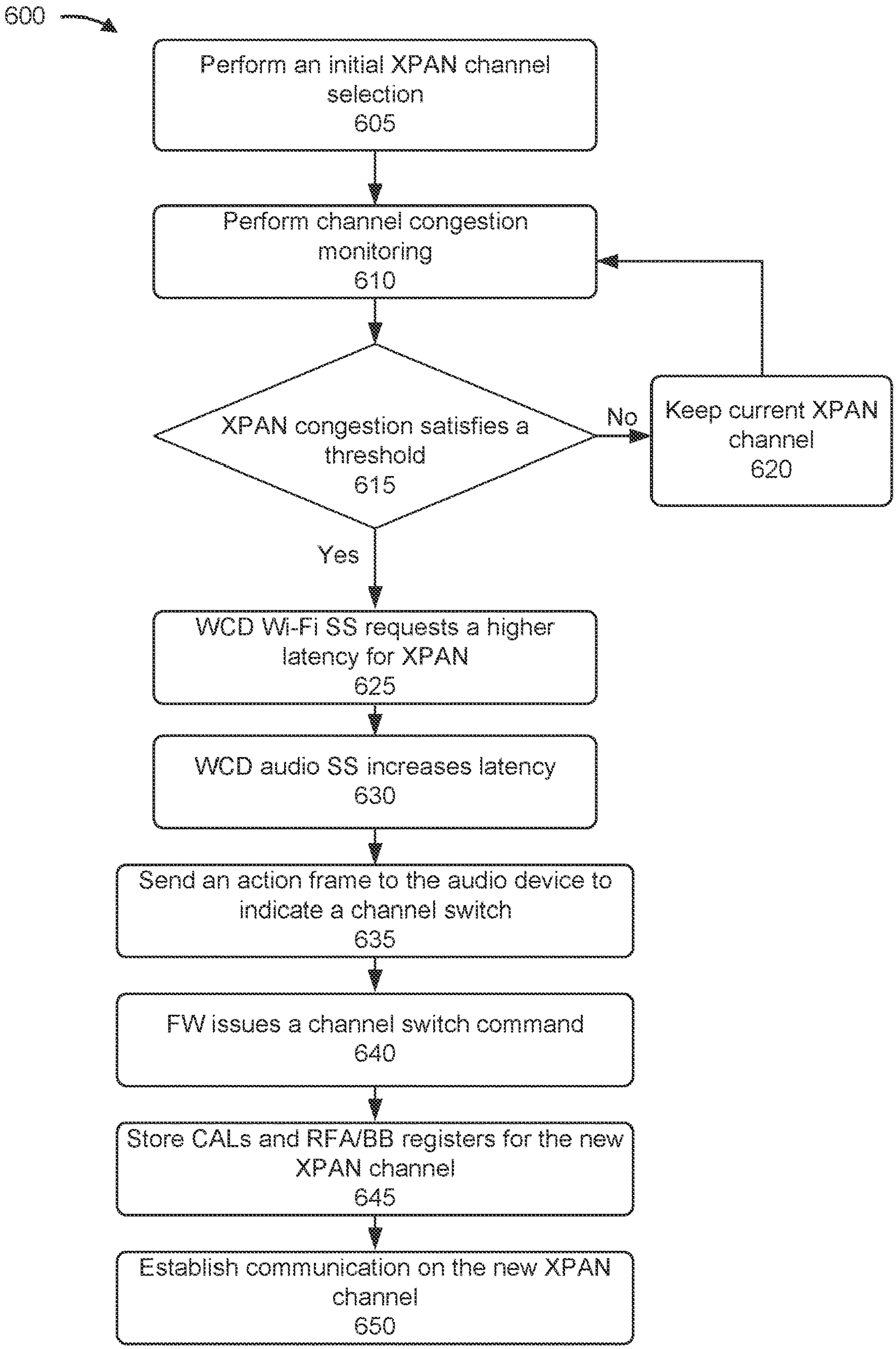
FIG. 6 is a diagram of an example associated with channel switching to a channel associated with a channel availability check, in accordance with the present disclosure.

FIG. 6 is a diagram of an example 600 associated with channel switching to a channel associated with a CAC, in accordance with the present disclosure. In context of FIG. 6, a WCD (e.g., a STA, a handset, a UE, or host device, among other examples) may communicate with a peripheral device (e.g., an earbud or another audio device, a wireless keyboard or other input device, an extended reality device, and/or a video device, among other examples). In some aspects, the WCD and the peripheral device may have established a wireless connection prior to operations shown in FIG. 6.

As shown by reference number 605, the WCD may perform an initial XPAN channel selection. In this example, the WCD may begin on an XPAN channel instead of beginning on a DFS channel.

As shown by reference number 610, the WCD may perform channel congestion monitoring. For example, the WCD may monitor congestion on XPAN channels and non-XPAN channels (e.g., DFS channels). In some aspects, the WCD may maintain CCA busy counters for the channels.

As shown by reference number 615, the WCD may determine whether an XPAN congestion satisfies a threshold for switching away from the XPAN channel.

As shown by reference number 620, if the XPAN congestion does not satisfy the threshold for switching away from the XPAN channel, the WCD may keep a current XPAN channel for ongoing communications.

As shown by reference number 625, if the XPAN congestion satisfies the threshold for switching away from the XPAN channel, a Wi-Fi SS of the WCD may request a higher latency for XPAN.

As shown by reference number 630, an audio SS of the WCD may increase latency.

As shown by reference number 635, the WCD may send an action frame to an audio device to indicate a channel switch.

As shown by reference number 640, a firmware FW, software, and/or hardware of the WCD may issue a channel switch command.

As shown by reference number 645, the WCD may store calibrations and radio frequency analog (RFA) and/or baseband (BB) registers for the new XPAN channel.

As shown by reference number 650, the WCD may establish communication on the new XPAN channel.

As indicated above, FIG. 6 is provided as an example. Other examples may differ from what is described with regard to FIG. 6.

Figure 7:
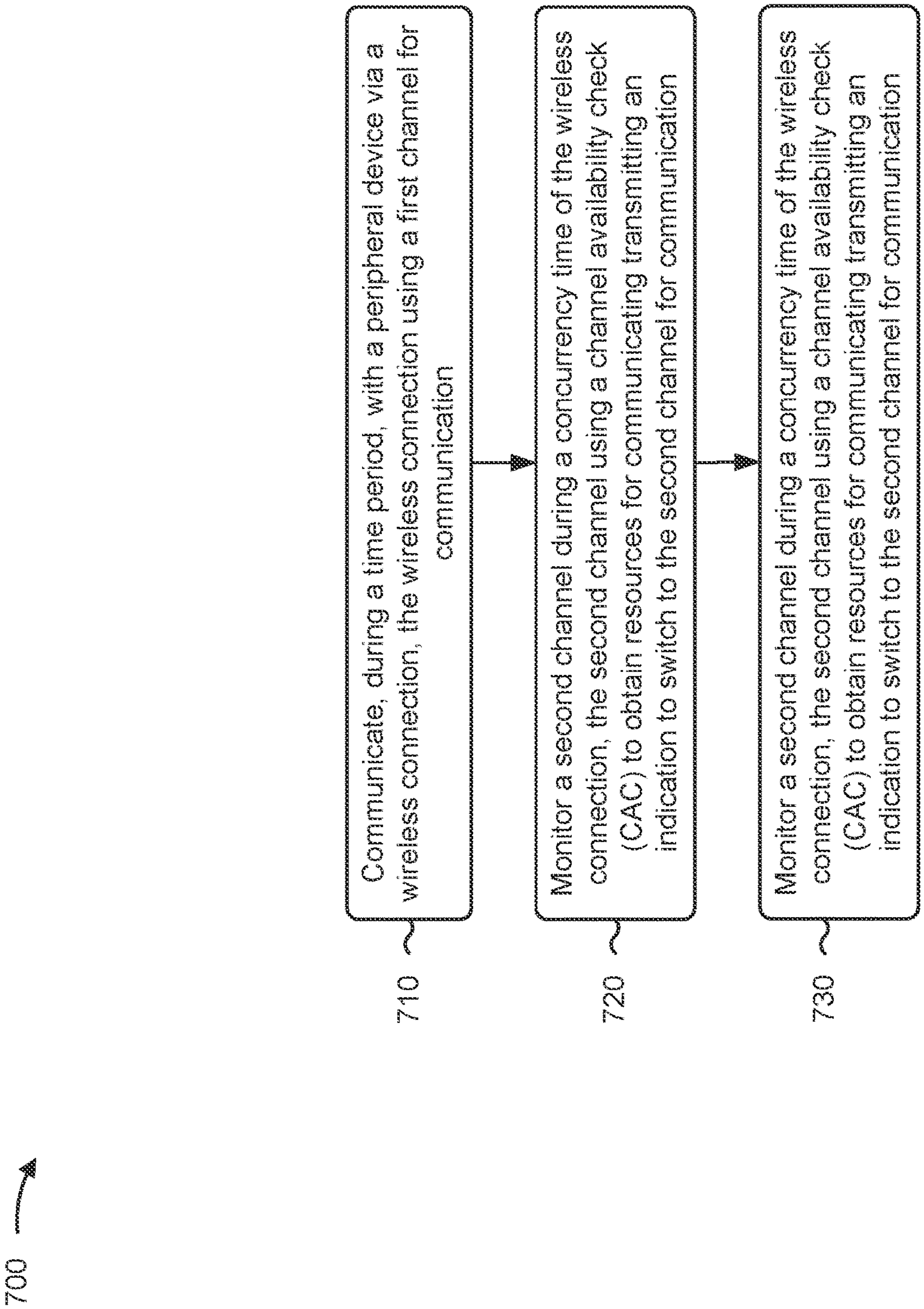
FIG. 7 is a diagram illustrating an example process performed, for example, by a wireless communication device (WCD), in accordance with the present disclosure.

FIG. 7 is a diagram illustrating an example process 700 performed, for example, by a WCD, in accordance with the present disclosure. Example process 700 is an example where the WCD (e.g., WCD 115) performs operations associated with dynamic start times for periodic communications of an audio device.

As shown in FIG. 7, in some aspects, process 700 may include communicating, during a time period, with a peripheral device via a wireless connection, the wireless connection using a first channel for communication (block 710). For example, the WCD (e.g., using communication manager 908, reception component 902, and/or transmission component 904 depicted in FIG. 9) may communicate, during a time period, with a peripheral device via a wireless connection, the wireless connection using a first channel for communication, as described above.

As further shown in FIG. 7, in some aspects, process 700 may include monitoring a second channel during a concurrency time of the wireless connection, the second channel using a channel availability check (CAC) to obtain resources for communicating (block 720). For example, the WCD (e.g., using transmission component 904 depicted in FIG. 9) monitor a second channel during a concurrency time of the wireless connection, the second channel using a CAC to obtain resources for communicating, as described above.

As further shown in FIG. 7, in some aspects, process 700 may include transmitting an indication to switch to a second channel for communication (block 730). For example, the WCD (e.g., using transmission component 904 depicted in FIG. 9) may transmit an indication to switch to the second channel for communication, as described above.

Process 700 may include additional aspects, such as any single aspect or any combination of aspects described below and/or in connection with one or more other processes described elsewhere herein.

In a first aspect, the second channel is associated with radar-based signaling, military-based communications, or satellite-based communications.

In a second aspect, alone or in combination with the first aspect, the second channel associated with a transmission power limit that is less than a transmission power limit associated with the first channel.

In a third aspect, alone or in combination with one or more of the first and second aspects, process 700 includes monitoring the second channel for availability before transmitting the indication to switch.

In a fourth aspect, alone or in combination with one or more of the first through third aspects, monitoring the second channel comprises one or more of monitoring the second channel using a first transmission chain or first radio device that is different from a second transmission chain or second radio device used for communicating using the first channel during the time period, or monitoring the second channel during a concurrency time of the wireless connection.

In a fifth aspect, alone or in combination with one or more of the first through fourth aspects, process 700 includes performing the CAC before transmitting the indication to switch to the second channel, and selecting the second channel from one or more available channels that are available based at least in part on performance of the CAC.

In a sixth aspect, alone or in combination with one or more of the first through fifth aspects, selecting the second channel comprises selecting the second channel based at least in part on one or more of a congestion of the second channel, a bias toward using a channel that uses CAC to obtain resources for communicating.

In a seventh aspect, alone or in combination with one or more of the first through sixth aspects, process 700 includes communicating using the second channel, monitoring for communications having a priority that is higher than a priority of the wireless connection, and transmitting an indication to switch to a third channel for communications based at least in part on detection, in the second channel, of a communication having a priority that is higher than the priority of the wireless connection.

In an eighth aspect, alone or in combination with one or more of the first through seventh aspects, process 700 includes providing, before transmission of the indication to switch to the second channel for communication, an indication to increase a latency of communications via the first channel. In some aspects, the WCD may first increase latency internal to the WCD and, once latency is increased at the WCD, the WCD may communicate an updated value of a TWT SI to the peripheral device if a current TWT SI is not sufficient to perform a channel switch.

In a ninth aspect, alone or in combination with one or more of the first through eighth aspects, transmission of the indication to switch to the second channel for communication comprises transmitting the indication via a DTIM, or transmitting the indication via a vendor-specific action frame.

In a tenth aspect, alone or in combination with one or more of the first through ninth aspects, transmission of the indication to switch to the second channel for communication is based at least in part on one or more of obtaining of resources of the second channel based at least in part on using a CAC, or congestion of the first channel.

In an eleventh aspect, alone or in combination with one or more of the first through tenth aspects, the indication to switch to the second channel for communication comprises one or more of an indication of parameters of the second channel, or an indication of a time to begin using the second channel.

In a twelfth aspect, alone or in combination with one or more of the first through eleventh aspects, the first channel uses the CAC to obtain resource for communicating, or wherein the first channel does not use CAC.

In a thirteenth aspect, alone or in combination with one or more of the first through twelfth aspects, the peripheral device comprises one or more of an audio device, an extended reality device, or a video display device.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
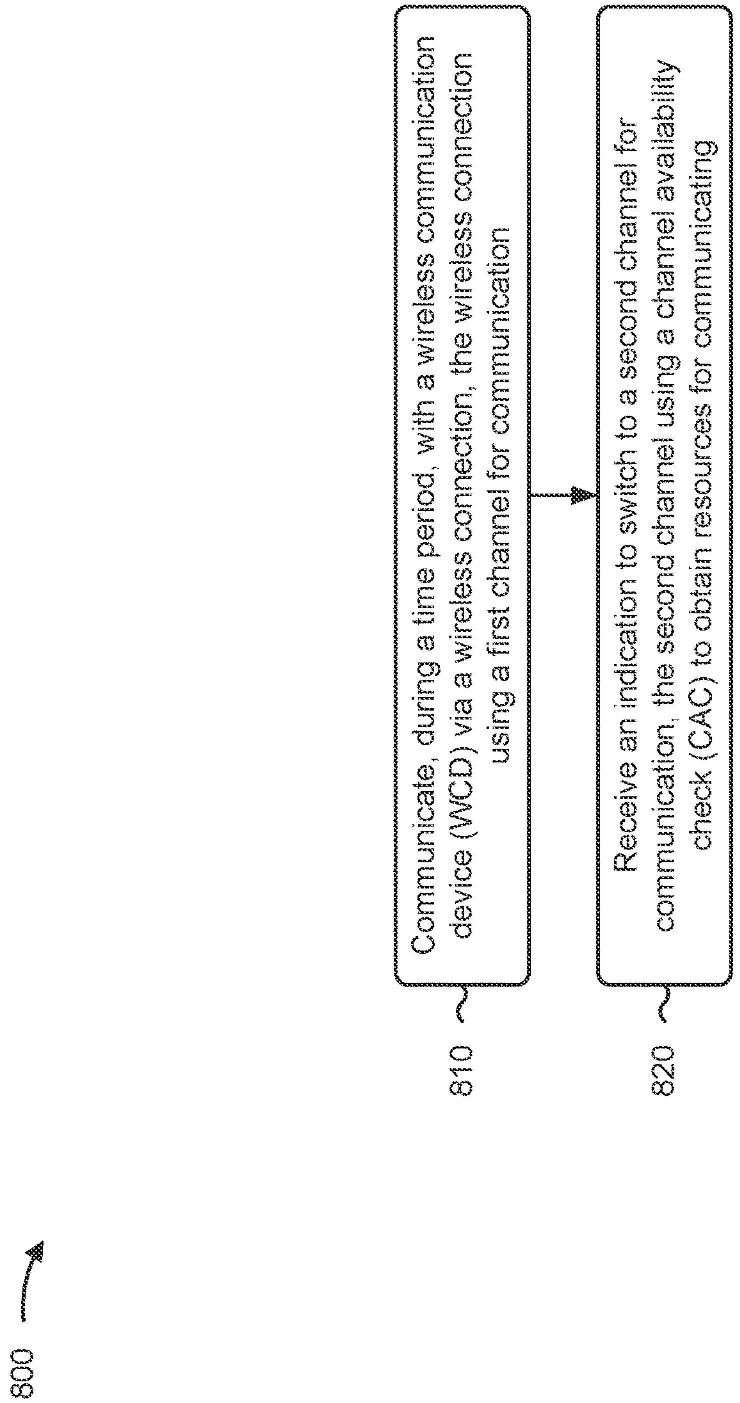
FIG. 8 is a diagram illustrating an example process performed, for example, by a peripheral device, in accordance with the present disclosure.

FIG. 8 is a diagram illustrating an example process 800 performed, for example, by a peripheral device, in accordance with the present disclosure. Example process 800 is an example where the peripheral device (e.g., wireless earbud 130, an XR device, and/or an audio device) performs operations associated with channel switching to a channel associated with a channel availability check. For example, a channel switch procedure may be initiated by a WCD (e.g., acting as an SAP). Once the WCD finds a new DFS or non-DFS channel to switch to, the WCD indicates associated info to the peripheral device and the peripheral device follows instructions from the WCD.

As shown in FIG. 8, in some aspects, process 800 may include communicating, during a time period, with a WCD via a wireless connection, the wireless connection using a first channel for communication (block 810). For example, the peripheral device (e.g., using communication manager 1008, reception component 1002, and/or transmission component 1004 depicted in FIG. 10) may communicate, during a time period, with a WCD via a wireless connection, the wireless connection using a first channel for communication, as described above.

As further shown in FIG. 8, in some aspects, process 800 may include receiving an indication to switch to a second channel for communication, the second channel using a CAC to obtain resources for communicating (block 820). For example, the peripheral device (e.g., using reception component 1002 depicted in FIG. 10) may receive an indication to switch to a second channel for communication, the second channel using a CAC to obtain resources for communicating, as described above.

Process 800 may include additional aspects, such as any single aspect or any combination of aspects described below and/or in connection with one or more other processes described elsewhere herein.

In a first aspect, the second channel is associated with radar-based signaling, military-based communications, or satellite-based communications.

In a second aspect, alone or in combination with the first aspect, the second channel associated with a transmission power limit that is less than a transmission power limit associated with the first channel.

In a third aspect, alone or in combination with one or more of the first and second aspects, process 800 includes communicating using the second channel, and receiving an indication to switch to a third channel for communications based at least in part on detection, in the second channel, of a communication having a priority that is higher than the priority of the wireless connection.

In a fourth aspect, alone or in combination with one or more of the first through third aspects, process 800 includes receiving, before reception of the indication to switch to the second channel for communication, an indication to increase a latency of communications via the first channel.

In a fifth aspect, alone or in combination with one or more of the first through fourth aspects, reception of the indication to switch to the second channel for communication comprises receiving the indication via a DTIM, or receiving the indication via a vendor-specific action frame.

In a sixth aspect, alone or in combination with one or more of the first through fifth aspects, reception of the indication to switch to the second channel for communication is based at least in part on one or more of obtaining of resources of the second channel based at least in part on a CAC, or congestion of the first channel.

In a seventh aspect, alone or in combination with one or more of the first through sixth aspects, the indication to switch to the second channel for communication comprises one or more of an indication of parameters of the second channel, or an indication of a time to begin using the second channel.

In an eighth aspect, alone or in combination with one or more of the first through seventh aspects, the first channel uses the CAC to obtain resource for communicating, or wherein the first channel does not use CAC.

In a ninth aspect, alone or in combination with one or more of the first through eighth aspects, the peripheral device comprises one or more of an audio device, an extended reality device, or a video display device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
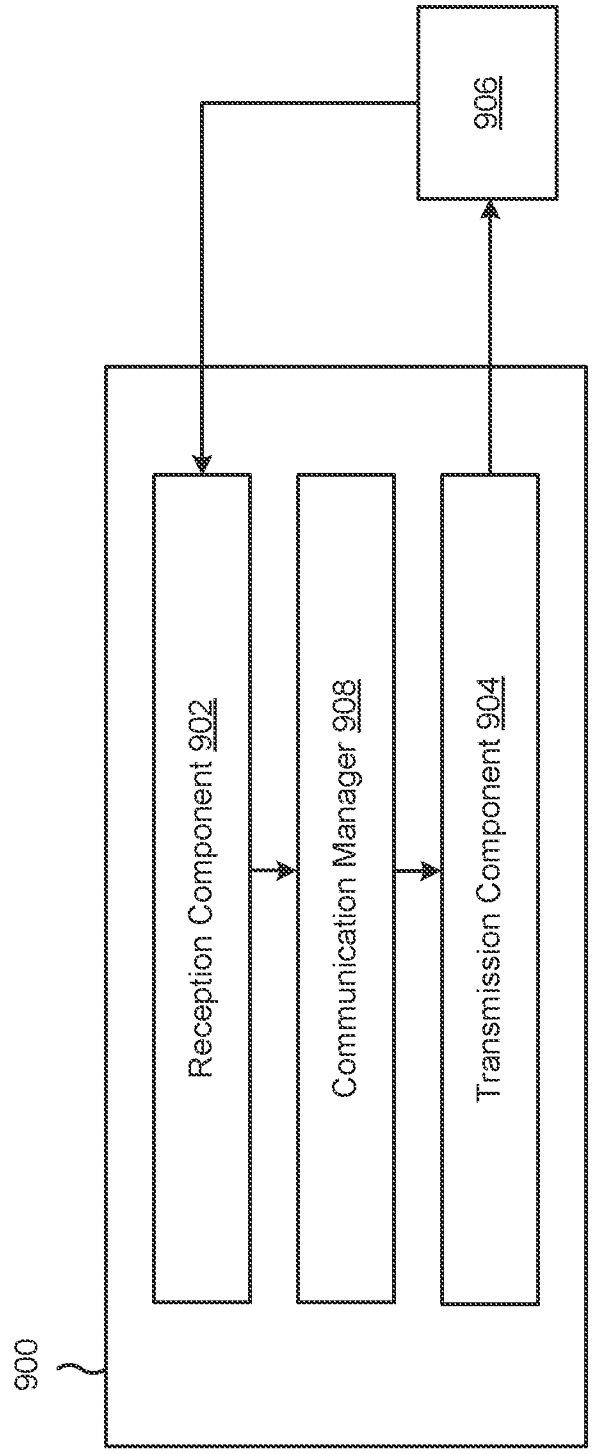
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a WCD, or a WCD may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a peripheral device, an earbud, an audio device, and/or another wireless communication device) using the reception component 902 and the transmission component 904. As further shown, the apparatus 900 may include the communication manager 908.

In some aspects, the apparatus 900 may be configured to perform one or more operations described herein. Additionally, or alternatively, the apparatus 900 may be configured to perform one or more processes described herein, such as process 700 of FIG. 7. In some aspects, the apparatus 900 and/or one or more components shown in FIG. 9 may include one or more components of the WCD described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a multiple-input multiple-output (MIMO) detector, a receive processor, a controller/processor, a memory, or a combination thereof, of the WCD described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the WCD described in connection with FIG. 2. In some aspects, the transmission component 904 may be co-located with the reception component 902 in a transceiver.

The communication manager 908, reception component 902, and/or transmission component 904 may communicate, during a time period, with a peripheral device via a wireless connection, the wireless connection using a first channel for communication. The transmission component 904 may transmit an indication to switch to a second channel for communication, the second channel using a CAC to obtain resources for communicating.

The communication manager 908 and/or reception component 902 may monitor the second channel for availability before transmitting the indication to switch.

The communication manager 908 and/or reception component 902 may perform the CAC before transmitting the indication to switch to the second channel.

The communication manager 908 may select the second channel from one or more available channels that are available based at least in part on performance of the CAC.

The communication manager 908, reception component 902, and/or transmission component 904 may communicate using the second channel.

The communication manager 908 and/or reception component 902 may monitor for communications having a priority that is higher than a priority of the wireless connection.

The transmission component 904 may transmit an indication to switch to a third channel for communications based at least in part on detection, in the second channel, of a communication having a priority that is higher than the priority of the wireless connection.

The transmission component 904 may transmit, before transmission of the indication to switch to the second channel for communication, an indication to increase a latency of communications via the first channel.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
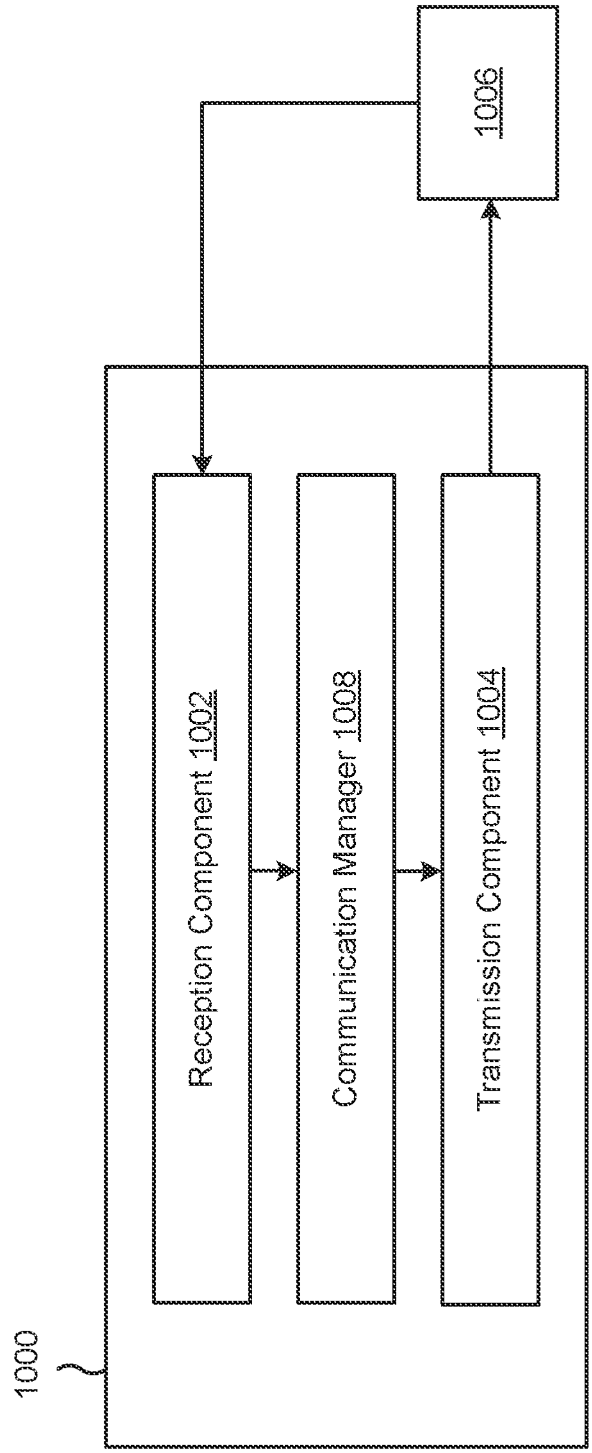
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a second audio device, or a second audio device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as another peripheral device, a WCD, and/or another wireless communication device) using the reception component 1002 and the transmission component 1004. As further shown, the apparatus 1000 may include the communication manager 1008.

In some aspects, the apparatus 1000 may be configured to perform one or more operations described herein. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the peripheral device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the peripheral device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the peripheral device described in connection with FIG. 2. In some aspects, the transmission component 1004 may be co-located with the reception component 1002 in a transceiver.

The communication manager 1008, reception component 1002, and/or transmission component 1004 may communicate, during a time period, with a WCD via a wireless connection, the wireless connection using a first channel for communication. The reception component 1002 may receive an indication to switch to a second channel for communication, the second channel using a CAC to obtain resources for communicating.

The communication manager 1008, reception component 1002, and/or transmission component 1004 may communicate using the second channel.

The reception component 1002 may receive an indication to switch to a third channel for communications based at least in part on detection, in the second channel, of a communication having a priority that is higher than the priority of the wireless connection.

The reception component 1002 may receive, before reception of the indication to switch to the second channel for communication, an indication to increase a latency of communications via the first channel.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless communication device (WCD), comprising: communicating, during a time period, with a peripheral device via a wireless connection, the wireless connection using a first channel for communication; and transmitting an indication to switch to a second channel for communication, the second channel using a channel availability check (CAC) to obtain resources for communicating.

Aspect 2: The method of Aspect 1, wherein the second channel is associated with radar-based signaling, military-based communications, or satellite-based communications.

Aspect 3: The method of any of Aspect 1-2, wherein the second channel associated with a transmission power limit that is less than a transmission power limit associated with the first channel.

Aspect 4: The method of any of Aspect 1-3, further comprising: monitoring the second channel for availability before transmitting the indication to switch.

Aspect 5: The method of Aspect 4, wherein monitoring the second channel comprises one or more of: monitoring the second channel using a first transmission chain or first radio device that is different from a second transmission chain or second radio device used for communicating using the first channel during the time period; or monitoring the second channel during a concurrency time of the wireless connection.

Aspect 6: The method of any of Aspect 1-5, further comprising: performing the CAC before transmitting the indication to switch to the second channel; and selecting the second channel from one or more available channels that are available based at least in part on performance of the CAC.

Aspect 7: The method of Aspect 6, wherein selecting the second channel comprises selecting the second channel based at least in part on one or more of: a congestion of the second channel, a bias toward using a channel that uses CAC to obtain resources for communicating.

Aspect 8: The method of any of Aspect 1-7, further comprising: communicating using the second channel;

monitoring for communications having a priority that is higher than a priority of the wireless connection; and transmitting an indication to switch to a third channel for communications based at least in part on detection, in the second channel, of a communication having a priority that is higher than the priority of the wireless connection.

Aspect 9: The method of any of Aspect 1-8, further comprising: providing, before transmission of the indication to switch to the second channel for communication, an indication to increase a latency of communications via the first channel.

Aspect 10: The method of any of Aspect 1-9, wherein transmission of the indication to switch to the second channel for communication comprises: transmitting the indication via a channel switch announcement (CSA), or transmitting the indication via a vendor-specific action frame.

Aspect 11: The method of any of Aspect 1-10, wherein transmission of the indication to switch to the second channel for communication is based at least in part on one or more of: obtaining of resources of the second channel based at least in part on using a CAC, or congestion of the first channel.

Aspect 12: The method of any of Aspect 1-11, wherein the indication to switch to the second channel for communication comprises one or more of: an indication of parameters of the second channel, or an indication of a time to begin using the second channel.

Aspect 13: The method of any of Aspect 1-12, wherein the first channel uses the CAC to obtain resource for communicating, or wherein the first channel does not use CAC.

Aspect 14: The method of any of Aspect 1-13, wherein the peripheral device comprises one or more of: an audio device, an extended reality device, or a video display device.

Aspect 15: A method of wireless communication performed by a peripheral device, comprising: communicating, during a time period, with a wireless communication device (WCD) via a wireless connection, the wireless connection using a first channel for communication; and receiving an indication to switch to a second channel for communication, the second channel using a channel availability check (CAC) to obtain resources for communicating.

Aspect 16: The method of Aspect 15, wherein the second channel is associated with radar-based signaling, military-based communications, or satellite-based communications.

Aspect 17: The method of any of Aspects 15-16, wherein the second channel associated with a transmission power limit that is less than a transmission power limit associated with the first channel.

Aspect 18: The method of any of Aspects 15-17, further comprising: communicating using the second channel; and receiving an indication to switch to a third channel for communications based at least in part on detection, in the second channel, of a communication having a priority that is higher than the priority of the wireless connection.

Aspect 19: The method of any of Aspects 15-18, further comprising: receiving, before reception of the indication to switch to the second channel for communication, an indication to increase a latency of communications via the first channel.

Aspect 20: The method of any of Aspects 15-19, wherein reception of the indication to switch to the second channel for communication comprises: receiving the indication via a channel switch announcement (CSA), or receiving the indication via a vendor-specific action frame.

Aspect 21: The method of any of Aspects 15-20, wherein reception of the indication to switch to the second channel for communication is based at least in part on one or more of: obtaining of resources of the second channel based at least in part on a CAC, or congestion of the first channel.

Aspect 22: The method of any of Aspects 15-21, wherein the indication to switch to the second channel for communication comprises one or more of: an indication of parameters of the second channel, or an indication of a time to begin using the second channel.

Aspect 23: The method of any of Aspects 15-22, wherein the first channel uses the CAC to obtain resource for communicating, or wherein the first channel does not use CAC.

Aspect 24: The method of any of Aspects 15-23, wherein the peripheral device comprises one or more of: an audio device, an extended reality device, or a video display device.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device (WCD) for wireless communication, comprising:
- one or more memories; and
- one or more processors, coupled to the one or more memories, configured to cause the WCD to:
  - communicate, during a time period, with a peripheral device via a wireless connection, the wireless connection using a first channel for communication;
  - monitor a second channel during a concurrency time of the wireless connection, wherein the second channel is a Dynamic Frequency Selection (DFS) channel using a channel availability check (CAC) to obtain resources for communicating;
  - transmit, to the peripheral device, an indication to increase a latency target for communications via the first channel;
  - select the second channel from a list of DFS available channels based at least in part on performance of the CAC; and
  - transmit, based at least in part on the indication to increase the latency target, an indication to switch to the second channel for communication based on selection of the second channel.

2. The WCD of claim 1, wherein the second channel is associated with radar-based signaling, military-based communications, or satellite-based communications.

3. The WCD of claim 1, wherein the second channel is associated with a transmission power limit that is less than a transmission power limit associated with the first channel.

4. The WCD of claim 1, wherein the one or more processors are further configured to cause the WCD to:
- monitor the second channel for availability before transmitting the indication to switch.

5. The WCD of claim 4, wherein the one or more processors, to monitor the second channel, are configured to cause the WCD to:
- monitor the second channel using a first transmission chain or first radio device that is different from a second transmission chain or second radio device used for communicating using the first channel during the time period.

6. The WCD of claim 1, wherein the one or more processors are further configured to cause the WCD to:
- perform the CAC before transmitting the indication to switch to the second channel; and
- select the second channel from one or more available channels that are available based at least in part on performance of the CAC.

7. The WCD of claim 6, wherein the one or more processors, to select the second channel, are configured to select the second channel based at least in part on one or more of:
- a congestion of the second channel,
- a bias toward using a channel that uses CAC to obtain resources for communicating.

8. The WCD of claim 1, wherein the one or more processors are further configured to cause the WCD to:
- communicate using the second channel;
- monitor for communications having a priority that is higher than a priority of the wireless connection; and
- transmit an indication to switch to a third channel for communications based at least in part on detection, in the second channel, of a communication having a priority that is higher than the priority of the wireless connection.

9. The WCD of claim 1, wherein transmission of the indication to switch to the second channel for communication comprises:
- transmission of the indication via a channel switch announcement (CSA), or
- transmission of the indication via a vendor-specific action frame.

10. The WCD of claim 1, wherein transmission of the indication to switch to the second channel for communication is based at least in part on one or more of:
- obtaining of resources of the second channel based at least in part on using a CAC, or
- congestion of the first channel.

11. The WCD of claim 1, wherein the indication to switch to the second channel for communication comprises one or more of:
- an indication of parameters of the second channel, or
- an indication of a time to begin using the second channel.

12. The WCD of claim 1, wherein the first channel uses the CAC to obtain resource for communicating, or wherein the first channel does not use CAC.

13. The WCD of claim 1, wherein the peripheral device comprises one or more of:
- an audio device,
- an extended reality device, or
- a video display device.

14. A peripheral device for wireless communication, comprising:

one or more memories; and one or more processors, coupled to the one or more memories, configured to cause the peripheral device to:

communicate, during a time period, with a wireless communication device (WCD) via a wireless connection, the wireless connection using a first channel for communication;

receive, from the WCD, an indication to increase a latency target for communications via the first channel; and receive, based at least in part on the indication to increase the latency target, an indication to switch to a second channel selected from a list of Dynamic Frequency Selection (DFS) available channels for communication, wherein the second channel is DFS channel using a channel availability check (CAC) to obtain resources for communicating.

15. The peripheral device of claim 14, wherein the second channel is associated with radar-based signaling, military-based communications, or satellite-based communications.

16. The peripheral device of claim 14, wherein the second channel associated with a transmission power limit that is less than a transmission power limit associated with the first channel.

17. The peripheral device of claim 14, wherein the one or more processors are further configured to cause the peripheral device to:

communicate using the second channel; and receive an indication to switch to a third channel for communications based at least in part on detection, in the second channel, of a communication having a priority that is higher than the priority of the wireless connection.

18. The peripheral device of claim 14, wherein reception of the indication to switch to the second channel for communication comprises:

reception of the indication via a channel switch announcement (CSA), or reception of the indication via a vendor-specific action frame.

19. The peripheral device of claim 14, wherein reception of the indication to switch to the second channel for communication is based at least in part on one or more of:

obtaining of resources of the second channel based at least in part on a CAC, or congestion of the first channel.

20. The peripheral device of claim 14, wherein the indication to switch to the second channel for communication comprises one or more of:

an indication of parameters of the second channel, or an indication of a time to begin using the second channel.

21. The peripheral device of claim 14, wherein the first channel uses the CAC to obtain resource for communicating, or wherein the first channel does not use CAC.

22. The peripheral device of claim 14, wherein the peripheral device comprises one or more of:

an audio device, an extended reality device, or a video display device.

23. A method of wireless communication performed by a wireless communication device (WCD), comprising:

communicating, during a time period, with a peripheral device via a wireless connection, the wireless connection using a first channel for communication;

monitoring a second channel during a concurrency time of the wireless connection, wherein the second channel is a Dynamic Frequency Selection (DFS) channel using a channel availability check (CAC) to obtain resources for communicating;

transmitting, to the peripheral device, an indication to increase a latency target for communications via the first channel;

selecting the second channel from a list of DFS available channels based at least in part on performance of the CAC; and transmitting, based at least in part on the indication to increase the latency target, an indication to switch to the second channel for communication based on selecting the second channel.

24. The method of claim 23, further comprising:

monitoring the second channel for availability before transmitting the indication to switch.

25. The method of claim 23, further comprising:

performing the CAC before transmitting the indication to switch to the second channel; and selecting the second channel from one or more available channels that are available based at least in part on performance of the CAC.

26. A method of wireless communication performed by a peripheral device, comprising:

communicating, during a time period, with a wireless communication device (WCD) via a wireless connection, the wireless connection using a first channel for communication;

receiving, from the WCD, an indication to increase a latency target for communications via the first channel; and receiving, based at least in part on the indication to increase the latency target, an indication to switch to a second channel selected from a list of Dynamic Frequency Selection (DFS) available channels for communication, wherein the second channel is a DFS channel using a channel availability check (CAC) to obtain resources for communicating.

27. The method of claim 26, wherein the second channel associated with a transmission power limit that is less than a transmission power limit associated with the first channel.

28. The method of claim 26, wherein reception of the indication to switch to the second channel for communication is based at least in part on one or more of:

obtaining of resources of the second channel based at least in part on a CAC, or congestion of the first channel.

29. The method of claim 23, wherein the second channel is associated with radar-based signaling, military-based communications, or satellite-based communications.

30. The method of claim 23, wherein the second channel is associated with a transmission power limit that is less than a transmission power limit associated with the first channel.

* * * * *